(12) United States Patent
Miyamoto et al.

(10) Patent No.: US 12,073,395 B2
(45) Date of Patent: Aug. 27, 2024

(54) FLEXIBLE DIGITAL TOKENS WITH APPLICATION PROGRAMMING INTERFACES FOR REDUCED COMPUTING CALLS

(71) Applicant: PAYPAL, INC., San Jose, CA (US)

(72) Inventors: Alex Kazuaki Miyamoto, Concord, CA (US); Rohit Ranjan, San Jose, CA (US); Christina Crone, New York, NY (US); Matthew Gerard Jacunski, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 310 days.

(21) Appl. No.: 17/494,739

(22) Filed: Oct. 5, 2021

(65) Prior Publication Data

US 2023/0104073 A1    Apr. 6, 2023

(51) Int. Cl.
| | |
|---|---|
| G06Q 20/00 | (2012.01) |
| G06F 9/54 | (2006.01) |
| G06F 16/903 | (2019.01) |
| G06Q 20/14 | (2012.01) |
| G06Q 20/38 | (2012.01) |
| G06Q 20/40 | (2012.01) |

(52) U.S. Cl.
CPC ........... *G06Q 20/385* (2013.01); *G06F 9/547* (2013.01); *G06F 16/90335* (2019.01); *G06Q 20/14* (2013.01); *G06Q 20/40145* (2013.01)

(58) Field of Classification Search
CPC ............... G06Q 20/14; G06Q 20/385; G06Q 20/40145; G06F 16/90335; G06F 9/547

USPC .................................................. 705/4, 35–45
See application file for complete search history.

(56) References Cited

U.S. PATENT DOCUMENTS

| | | | |
|---|---|---|---|
| 10,776,189 B2 * | 9/2020 | Bucchi | G06F 16/951 |
| 2013/0110727 A1 * | 5/2013 | Kobres | G06Q 20/382 |
| | | | 705/67 |
| 2015/0039444 A1 * | 2/2015 | Hardin | H04L 41/06 |
| | | | 705/14.69 |
| 2015/0163206 A1 * | 6/2015 | McCarthy | G06F 21/6227 |
| | | | 726/4 |
| 2017/0085555 A1 * | 3/2017 | Bisikalo | G06F 3/0619 |
| 2017/0132627 A1 * | 5/2017 | Phillips | G06Q 30/0613 |
| 2018/0225660 A1 * | 8/2018 | Chapman | G06Q 20/10 |
| 2018/0330349 A1 * | 11/2018 | Uhr | G06Q 20/3827 |

(Continued)

*Primary Examiner* — Eric T Wong
*Assistant Examiner* — Mohammed H Mustafa
(74) *Attorney, Agent, or Firm* — Haynes and Boone, LLP

(57) ABSTRACT

There are provided systems and methods for flexible digital tokens with application programming interfaces for reduced computing calls. A service provider, such as an electronic transaction processor for digital transactions, may provide a processing system, stack and API that allows for generation of flexible payment tokens that can be used for electronic transaction processing with external service providers including social networking platforms and services. The processing system for the transaction processor may include an API in a compatible language with the APIs of the external service providers. Specific API calls and queries, which may correspond to GraphQL mutations, may be used to execute operations between the APIs of the interfacing systems to have a legacy processing system and API to generate a billing agreement. Once generated, the billing agreement may be tokenized, and a payment token used for payment processing.

20 Claims, 6 Drawing Sheets

(56) References Cited

U.S. PATENT DOCUMENTS

| | | | |
|---|---|---|---|
| 2019/0196890 A1* | 6/2019 | Bucchi | G06F 16/951 |
| 2019/0318122 A1* | 10/2019 | Hockey | G06Q 20/02 |
| 2019/0340287 A1* | 11/2019 | Tamjidi | G06F 16/242 |
| 2019/0370370 A1* | 12/2019 | Wittern | G06F 16/24556 |
| 2019/0392441 A1* | 12/2019 | Lee | G06N 20/00 |
| 2020/0104296 A1* | 4/2020 | Hunn | G06F 16/27 |
| 2021/0233045 A1* | 7/2021 | Singh | G06Q 20/12 |
| 2021/0304143 A1* | 9/2021 | Lucas | G06F 21/6245 |
| 2022/0075825 A1* | 3/2022 | Helms | H04L 9/3234 |
| 2022/0171772 A1* | 6/2022 | Vanderploeg | G06F 16/24547 |
| 2023/0104073 A1* | 4/2023 | Miyamoto | G06Q 20/14 705/40 |

* cited by examiner

FLEXIBLE DIGITAL TOKENS WITH APPLICATION PROGRAMMING INTERFACES FOR REDUCED COMPUTING CALLS

TECHNICAL FIELD

The present application generally relates to integrating application programming interfaces (APIs) of transaction processors and service providers and more particularly to providing flexible digital tokens that may be used with GraphQL API stacks for API interoperability.

BACKGROUND

Online transaction processors may have large computing systems and services that provide interfaces and interactions with different end users, such as customers, client service providers, and the like for electronic transaction processing. Service providers may interact with the online transaction processors in order to request processing of digital transactions. For example, a social networking service provider may process payments on their social networking platform, which may include recurring payments including subscriptions, advertisements, micropayments within social networking and/or gaming applications, and the like. Certain APIs are used by these service providers to allow for interaction with the service provider and/or provide services. However, legacy APIs of online transaction processors may not be compatible with the coding, programming, and/or query language used by the APIs of the service providers. Furthermore, the online transaction processors may have different processing stacks used for data processing, such as for generating and processing digital payment tokens associated with billing agreements that allow for electronic transaction processing. Thus, these online transaction processors may require operations to integrate with different APIs to exchange and process digital payment tokens. Without such operations, multiple API may exchange calls and requests that may cause excess interactions, inputs, and outputs that increase use of computing and network resources for token processing.

Figure 1:
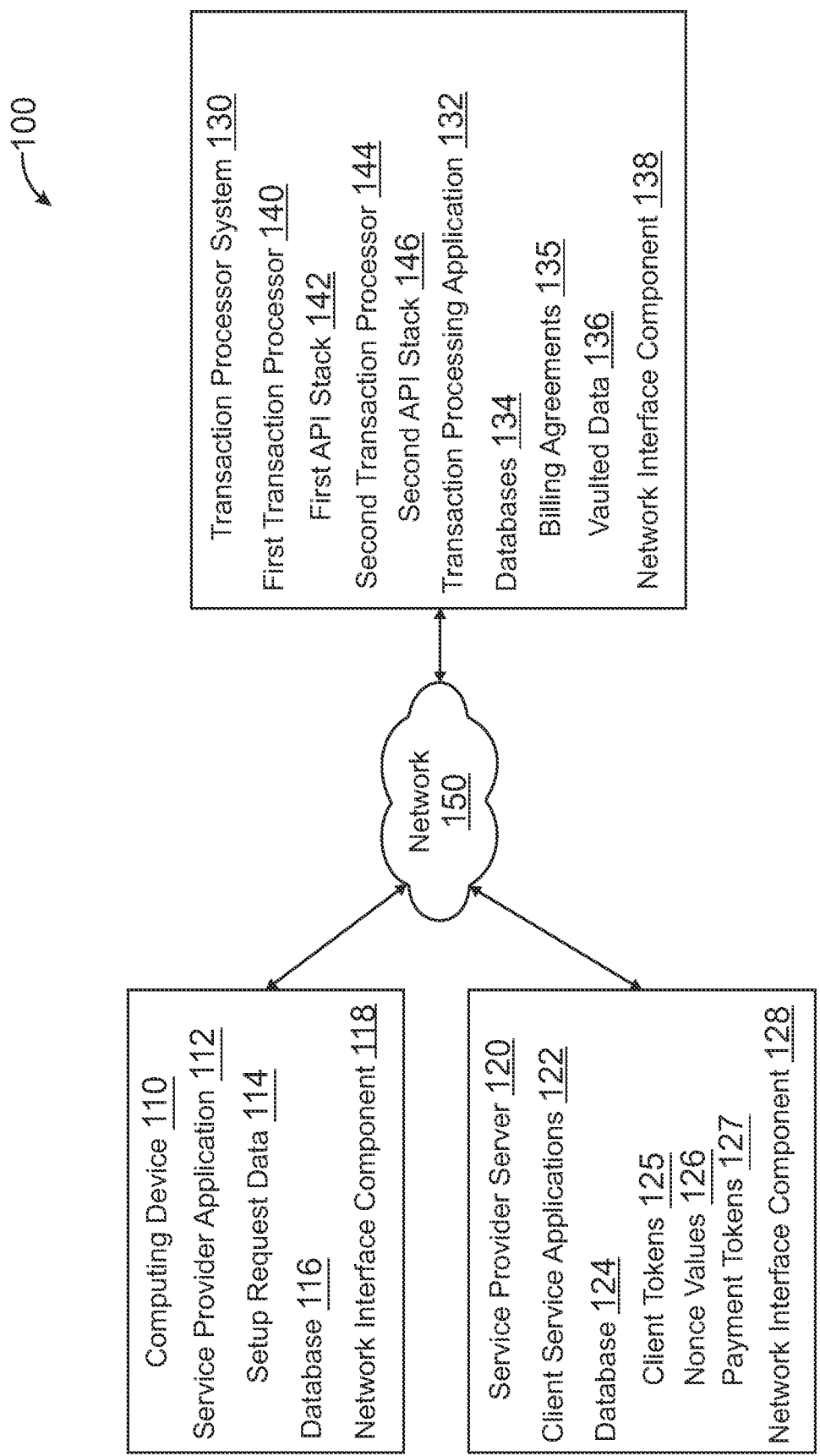
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for flexible digital tokens with application programming interfaces for reduced computing calls. Systems suitable for practicing methods of the present disclosure are also provided.

In large computing systems of transactions processors, different data processing stacks may have different API and programming or query language requirements for exchanging API calls and requests during data processing. These computing systems may further interact with customer and client service provider systems, including those associated with social networking, microblogging, media sharing, messaging, business and consumer platforms, etc. When interacting with these systems, APIs are integrated to exchange API calls and requests during data processing. The transaction processor may include different computing systems and processing stacks that require compatibility with these service provider APIs. In order to provide compatibility between legacy enterprise platforms of the online transaction processor and a query and manipulation language for service provider APIs, the transaction processor may utilize an API in the corresponding language for a transaction processor platform that may exchange data reading, writing, and/or mutating requests with the service provider API. This may allow for establishing and processing flexible payment tokens that may be processed with legacy processing systems of the online transaction processor.

The service provider APIs may correspond to one or more GraphQL APIs that may use GraphQL as the query and manipulation language when interfacing with other APIs. In this regard, GraphQL may provide for faster data processing and response times by reducing the number of data fields within a query and creating queries that correspond to the specific data fields to be queried and returned. Further data queries and API calls may be presented as "mutations" in the GraphQL language that allow for specific data fields to be selected and requested in a query client-side (e.g., in place of a Hypertext Transfer Protocol (HTTP) request and response using RESTful endpoints). A response to a mutation may be returned as a predictable and/or standardized data shape for the GraphQL language.

For example, an online transaction processor (e.g., PayPal®), which may provide services to users including electronic transaction processing, may allow merchants, users, and other entities to process transactions, provide payments, provide content, and/or transfer funds between these users. The user may also interact with the service provider to establish an account and provide other information for the user. The online transaction processor may interact with service providers that provide computing services, including social networking, microblogging, media sharing, messaging, business and consumer platforms, etc. In this regard, these service providers that interact and integrate with the computing services, platforms, and APIs of the online transaction processor may correspond to integration partners and may be partner platforms and computing services of the transaction processor. Integration partners may have one or more partner relationships, agreements, and/or services that allow for data and computing operations to be shared and/or performed between the two online entities. In various embodiments, in order to utilize the transaction processing services of the online transaction processor, an account with the service provider may be established by providing account details, such as a login, password (or other authentication credential, such as a biometric fingerprint, retinal scan, etc.), identification information to establish the account (e.g., personal information for a user, business or merchant information for an entity, or other types of identification information including a name, address, and/or other information), and/or financial information. All of these interactions may generate and/or process data, which may be available for use with external service providers.

The online transaction processor may include APIs and endpoints used to execute API calls and requests, connect to, and/or fetch data from the resources, and otherwise interact with external service provider APIs. The online transaction processor may include multiple data processing and/or API stacks, each of which may perform certain operations and processes during generation of a digital billing agreement and/or flexible digital token that may be processed between the different processing and API stacks and the APIs of the external service provider. GraphQL may correspond to an engine and data query and manipulation language that may be used for API stack writing, coding, and generation. The query and manipulation language (such as GraphQL) may provide benefits to communication APIs by allowing a request query, or a mutation in the query and manipulation language, to specify the fields in a query by the API. query and manipulation language may utilize queries from clients and servers in place of HTTP requests. Thus, the structure of the request object may be defined by the API transmitting the query instead of the API that receives and handles the HTTP request. Further, this allows for APIs to fetch the specific data in a single request. A client or another server that executes a query via a query and manipulation language-based API may specify the particular data that is to be returned, which may be especially important for bandwidth problems that may affect mobile devices and/or cellular network communications. In the below examples, GraphQL is used, however it is understood that other query and manipulation language(s) can be used instead.

When using GraphQL-based APIs, mutations may correspond to calls or requests to modify, process, and/or return data from a data platform, such as those of the online transaction processor. A mutation may correspond to a query for a particular set of data as defined in the fields of the query. Certain mutations may also implement a data write or the like. Thus, a mutation query may modify data in a data store and return a value, which may correspond to inserting, updating, and/or deleting data during a write and/or read operation. Mutations may therefore correspond to certain calls executed in a format for a particular operation requested by the service provider's API to be performed by the online transaction processor's APIs.

In this regard, the service provider may request that a digital billing agreement be generated on behalf of an entity using the service provider, such as an end user, merchant, organization, company, or the like. The billing agreement may be used for future and/or recurring payments and may allow a payment token to be generated that may be used for the future or recurring payments by the service provider with the online transaction processor. This payment token may be flexible in that it may enable electronic transaction processing between different systems and APIs of the online transaction processor. In order to generate the billing agreement and flexible payment token, initially a client token is created using a create client token mutation received from a server of the corresponding service provider. The mutation may be received by an API of a corresponding processing system of the online transaction processor. These may correspond to GraphQL-based APIs. The client token may be used to initialize a client of the service provider to tokenize payment information for an entity. The client token may be returned to the server and may be used with the client of the service provider with the API of the online transaction processor. An authorization fingerprint may then be extracted by the first processing system of the online transaction processor for the corresponding API. The authorization fingerprint may be extracted from the client token when generated and may have a specific lifetime or time period of validity. For example, a client token may be decoded, and the client token may have a value for the authorization fingerprint.

Thereafter, a setup billing agreement mutation may be used by the API of the service provider to request creation and setup of the digital billing agreement for the entity with the online transaction processor. The billing agreement may enable recurring and/or future payments to be processed with legacy payment and transaction processing systems of the online transaction processor. The setup billing agreement mutation may use the authorization fingerprint to request creation of a billing agreement from a second processing system or stacks, and corresponding APIs, of the online transaction processor. The second processing system may initiate a billing agreement as a data structure requiring data for the billing agreement and used for the payments on behalf of the entity. The second processing system may return a billing agreement token and/or identifier, as well as a uniform resource location (URL) that redirects the client of the service provider to a webpage or interface that allows for user or entity approval. Using the URL and redirection, the entity may then provide any data for the billing agreement and allow the user to approve creation of the billing agreement and use with the payments. This may correspond to a billing agreement approval flow, such as navigations and operations for billing agreement approval.

On successful return from the approval interface that was redirected using the URL, billing agreement setup information may be tokenized using a tokenize billing agreement mutation. The tokenize billing agreement mutation may use the authorization fingerprint to return a payment method as a nonce value as a tokenize account payload to the service provider's client and server. In this regard, the mutation may retrieve entity information from the second processing system of the service provider, which may be associated with a digital payment account of the service provider for the entity. The first processing system may store the retrieved entity information, which may be tokenized. A nonce value may be generated for this information and returned to the service provider's client and server. The nonce may correspond to the single-use payment method for the entity. The service provider's server may further vault this information, such as by storing in one or more data vaults for later retrieval and use.

Thereafter, the service provider's server may request, using a vault account mutation, that the first processing system of the online transaction processor vault the account and/or information for the account with a data vault of the first processing system for use with the billing agreement. The first processing system may then execute the billing agreement with the second processing system such that the billing agreement is finalized and created using the corresponding information from the entity and/or from the entity's account. A billing agreement identifier may be returned to the first processing stack, which may generate the flexible payment token for the entity as a payment method usable for the future and/or recurring payments. This payment token may then be provided to the service provider's server.

In some embodiments, an existing billing agreement with the online transaction processor's second processing stack, the legacy processing stack that does not have APIs compatible with and/or integrated with the GraphQL API of the service provider, may be required to be used by the first processing stack for payment processing with the service provider's APIs. In this regard, the GraphQL API of the transaction processor's second processing stack may provide additional functionalities for interfacing with the service provider's API. This may include use of queries in the GraphQL standard. The caller-initiated requests allow the caller to determine the data required in a query and specify the particular data fields that are to be returned when the query is transmitted to the GraphQL-based API. GraphQL may further use mutation queries or mutations that allow for modification of data in a data store and return of a value. Thus, mutations may be part of the GraphQL schema and further allow callers to modify data and request data processing. Thus, the caller may designate the data that is to be returned, as well as the additional operations for execution by the callee, which may be returned in a standardized data format and/or shape.

Thus, instead of calling the legacy API of the online transaction processor, the new GraphQL API of the online transaction processor may be called for future or recurring payments using the existing billing agreement. In this regard, a billing agreement identifier for the existing billing agreement may be determined in response to a GraphQL vaulting mutation from the service provider's client and/or server. The GraphQL vaulting mutation may be transmitted to the GraphQL API of the first transaction processing stack of the online transaction processor that interfaces with the service provider. The GraphQL vaulting mutation may therefore correspond to a query or request to generate a nonce value for the billing agreement identifier, where the nonce value may then be used as a payment token for payment processing between the service provider's server and the GraphQL API and processing stack. The GraphQL vaulting mutation allows a new vaulted nonce value associated with the billing agreement identifier and the customer identifier to be generated. The new nonce value may be vaulted in a data vault for the first processing system using the GraphQL API with the customer identifier that may allow for later determination of the billing agreement with the second processing system of the online transaction processor. The nonce value may then be provided to the service provider's server for use as a payment method and token for the entity that allows for processing of the billing agreement for future and/or recurring payments.

Thereafter, when a payment is requested by the service provider's server on behalf of the entity, the service provider's server may request electronic transaction processing from the first processing system using the APIs of the server and the first processing system. These may correspond to GraphQL APIs, which may interact using a charge payment method mutation. The mutation may be transmitted by the service provider server's API to the first processing system's API. The mutation may utilize the flexible payment token provided to the service provider and may be transmitted in response to the entity requesting a purchase or payment via the service provider's client or may be performed in response to a recurring payment cycle, such as at a particular time or in response to an event. The first processing system may use the payment token to determine the billing agreement with the second processing system, such as a legacy processing stack and APIs for payment processing, which may be utilized for processing a transaction and/or payment. Thereafter, a result API call from the first processing system may be executed with the service provider's server API to return a transaction result. The billing agreement may include a payment method or instrument, such as a payment card, bank account, gift card, available account balance, or the like for the transaction and/or payment. Thus, this payment instrument may be processed to provide a payment on behalf of the entity, such as to the service provider and/or another user, merchant, or entity using the service provider.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110, a service provider server 120, and a transaction processor system 130 in communication over a network 150. Computing device 110 may be utilized by a user, customer, merchant, administrator, or other entity to access a computing service or resource provided by service provider server 120, where service provider server 120 may provide various data, operations, and other functions to computing device 110 via network 150. In this regard, computing device 110 may be used to request establishment of a digital billing agreement for payments to be made on or via service provider server 120 including future or recurring payments. Service provider server 120 may provide GraphQL-based processing stacks and APIs to interface with GraphQL-based processing stacks and APIs of transaction processor system 130 for billing agreement setup and payment token generation.

Computing device 110, service provider server 120, and transaction processor system 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing device 110 may be implemented as a communication device that may utilize appropriate hardware and software configured for wired and/or wireless communication with service provider server 120 and/or transaction processor system 130. For example, in one embodiment, computing device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Computing device 110 of FIG. 1 contains a service provider service provider application 112, a database 116, and a network interface component 118. Service provider service provider application 112 may correspond to executable processes, procedures, and/or applications with associated hardware. In other embodiments, computing device 110 may include additional or different modules having specialized hardware and/or software as required.

Service provider application 112 may correspond to one or more processes to execute modules and associated devices of computing device 110 to provide a convenient interface to permit a user for computing device 110 to utilize services of service provider server 120, such as those to enter, view, and/or process transactions, onboard and/or use digital accounts, and the like on a computing platform and/or service provided by service provider server 120. In this regard, service provider application 112 may correspond to specialized hardware and/or software utilized by computing device 110 that may provide transaction processing, such as through a user interface enabling the user to enter and/or view a transaction for processing. This may be based on a transaction generated by service provider application 112 using a service provider platform or website, merchant marketplace, or by performing peer-to-peer transfers and payments via service provider server 120 in conjunction with transaction processor system 130. Service provider application 112 may be associated with account information, user financial information, and/or transaction histories. In some embodiments, different services may be provided by service provider server 120 via service provider application 112 that may include the transaction processing services of transaction processor system 130, including social networking, messaging, media posting or sharing, microblogging, data browsing and searching, online shopping, and other services available through service provider server 120. Thus, service provider application 112 may also correspond to different service applications and the like that are associated with service provider server 120.

In this regard, service provider application 112 may process, display, and/or transmit setup request data 114 to service provider server 120 and/or transaction processor system 130. Setup request data 114 may correspond to data received by service provider server 120 and/or transaction processor system 130 during account setup and/or billing agreement establishment, such as data for an account and/or a payment card or financial instrument used for the billing agreement. In various embodiments, service provider application 112 may correspond to a general browser application configured to retrieve, present, and communicate information over the Internet (e.g., utilize resources on the World Wide Web) or a private network. For example, service provider application 112 may provide a web browser, which may send and receive information over network 150, including retrieving website information, presenting the website information to the user, and/or communicating information to the website, including navigating between webpages to login to accounts, process transactions, and/or otherwise utilize computing services. However, in other embodiments, service provider application 112 may include a dedicated software application of service provider server 120 or other entity (e.g., a merchant) resident on computing device 110 (e.g., a mobile application on a mobile device), which may be configured to navigate between application user interfaces (e.g., applications interfaces displayable by a graphical user interface (GUI) associated with service provider application 112). Thus, service provider service provider application 112 may provide one or more of user interfaces, for example, via graphical user interfaces (GUIs) presented using an output display device of computing device 110, to enable the user associated with computing device 110 to establish billing agreements.

Computing device 110 may further include database 116 stored on a transitory and/or non-transitory memory of computing device 110, which may store various applications and data and be utilized during execution of various modules of computing device 110. Database 116 may include, for example, identifiers such as operating system registry entries, cookies associated with service provider service provider application 112 and/or other applications 114, identifiers associated with hardware of computing device 110, or other appropriate identifiers, such as identifiers used for payment/user/device authentication or identification, which may be communicated as identifying the user/computing device 110 to service provider server 120.

Computing device 110 includes at least one network interface component 118 adapted to communicate with service provider server 120 and/or transaction processor system 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide one or more computing services to users via an online platform including social networking, messaging, media posting or sharing, microblogging, data browsing and searching, online shopping, and other services. In this regard, service provider server 120 includes one or more processing applications which may be configured to interact with computing device 110 and transaction processor system 130 for establishment of billing agreements used for payment processing via one or more processing and/or API stacks of transaction processor system 130. Thus, service provider server 120 may correspond to an integration partner of transaction processor system 130 that exchanges data with transaction processor system 130 for one or more services provided by transaction processor system 130 to that integration partner. In one example, service provider server 120 may correspond to a social networking platform where payments may be processed between users, for advertisements or other platform-specific costs, for recurring or future payments and microtransactions in video games or through social networking services, and the like. However, in other embodiments, service provider server 120 may be maintained by or include another type of service provider.

Service provider server 120 of FIG. 1 includes client service applications 122, a database 124, and a network interface component 128. Client service applications 122 may correspond to executable processes, procedures, and/or applications with associated hardware. In other embodiments, service provider server 120 may include additional or different modules having specialized hardware and/or software as required.

Client service applications 122 may correspond to one or more processes to execute modules and associated specialized hardware of service provider server 120 to provide an online platform and/or computing service, which may include processing transactions using billing agreements and payment tokens established with transaction processor system 130. In some embodiments, client service applications 122 may correspond to specialized hardware and/or software used by a user associated with computing device 110 to establish and/or link a payment account that may be used for processing the transactions on the platform provided by service provider server 120 using a billing agreement, which may be used to generate and provide user data for the user, as well as process transactions. The account and corresponding billing agreement may be generated between service provider server 120 using client service application 122 and a client provided by service provider server 120 to computing device 110 (e.g., a client application for use of the computing services).

In this regard, one or more of client service applications 122 may include GraphQL-based APIs that may interface and exchange API calls and requests with one or more corresponding GraphQL-based APIs of transaction processor system 130 for establishment of billing agreements and payment tokens on behalf of users for electronic transaction processing of transactions on service provider server 120. For example, client service applications 122 may include one or more GraphQL API stacks that may interface with transaction processor system 130 to execute queries and mutations requesting a return of data and/or one or more processing operations. The returned data may include payment tokens that may be used during future and/or recurring payments. The processing operations including data writes requested by mutations may therefore include requests to generate billing agreements and tokenize those billing agreements as the flexible tokens discussed herein for transaction processing between GraphQL-based APIs.

In various embodiments, financial information may be associated with a billing agreement for an entity. A billing agreement may be used to send and process payments, for example, through an interface provided by service provider server 120. The billing agreement may be used for payments requested through a browser application and/or dedicated payment application executed by computing device 110 and used by service provider server 120 using a flexible payment token corresponding to the billing agreement. The payments may include future or recurring payments that may be automatically processed using the payment token or other payment method provided to service provider server 120 based on the billing agreement. Client service applications 122 may process the payment with transaction processor system 130. In some embodiments, client service applications 122 may include social networking, microblogging, messaging, media sharing, messaging, business and consumer platforms, etc. Thus, the self-service assistance options provided for the services of client service applications 122 may include other assistance skills provided through electronic communication channels.

Additionally, service provider server 120 includes database 124. Database 124 may store various identifiers associated with computing device 110. Database 124 may also store account data, including payment instruments and authentication credentials, as well as transaction processing histories and data for processed transactions. Database 124 may store financial information and tokenization data, as well as transactions, transaction results, and other data generated and stored by client service applications 122.

Further, database 124 may store client tokens 125, nonce values 126, and/or payment tokens 127 used during generation of a billing agreement and/or later use of the billing agreement with transaction processor system 130 for payment processing using payment tokens 127 that are flexible for use with different APIs and processing stacks.

In various embodiments, service provider server 120 includes at least one network interface component 128 adapted to communicate computing device 110 and/or transaction processor system directly via one or more backend processing channels and/or over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Transaction processor system 130 may be maintained, for example, by an online service provider, which may provide electronic transaction processing operations, processing stacks, APIs, and services for processing transactions including transaction processed on, via, or through service provider server 120. In this regard, transaction processor system 130 includes one or more processing applications which may be configured to interact with computing device 110 and service provider server 120 to generate a billing agreement for a digital account of an entity and tokenize data for the billing agreement as a flexible payment token interoperable with various UIs in different programming and/or query languages for APIs of service provider server 120 and/or transaction processor system 130. In one example, transaction processor system 130 may be provided by PAYPAL®, Inc. of San Jose, CA, USA. However, in other embodiments, transaction processor system 130 may be maintained by or include another type of service provider.

Transaction processor system 130 of FIG. 1 includes a transaction processing application 132, databases 134, and a network interface component 138. A first transaction processor 140, a second transaction processor 144, and/or a transaction processing application 132 may correspond to executable processes, procedures, and/or applications with associated hardware. In other embodiments, transaction processor system 130 may include additional or different modules having specialized hardware and/or software as required.

Transaction processing application 132 may correspond to one or more processes to execute modules and associated specialized hardware of transaction processor server 130 to process a transaction and/or provide another service to end users of transaction processor system 130, which may include processes for electronic transaction processing via service provider server 120. In some embodiments, transaction processing application 132 may correspond to specialized hardware and/or software used by a user associated with computing device 110 to establish a payment account and/or digital wallet, which may be used to establish user information and provide payments, as well as create billing agreements between the user or entity of computing device 110, service provider server 120, and transaction processor system 130. The transactions may include those that are recurring and/or for future approved payments on a platform provided by service provider server 120, such as payment via a social networking service and platform. In various embodiments, financial information may be stored to the account, such as account/card numbers and information, or the financial information may be provided by when establishing one or more billing agreements. A digital token for the account/wallet/billing agreement, which may be used to send and process payments, for example, through an interface provided by service provider application 120 and/or transaction processor server 130.

The payment account may be accessed and/or used through a browser application and/or dedicated payment application executed by computing device 110 and engage in transaction processing through transaction processing application 132, which may occur in conjunction with service provider server 120 and/or be preapproved for recurring of future payments that are executed by service provider server 120 using a billing agreement. Transaction processing application 132 may process the payment and may provide a transaction history to computing device 110 and/or service provider server 120 that provides and/or records transaction authorization, approval, or denial. In this regard, for electronic transaction processing operations for payment provided on service provider server 120, transaction processing application 132 may utilize first transaction processor 140 and second transaction processor 144.

First transaction processor 140 and/or second transaction processor 144 may each correspond to one or more processing systems or subsystems having corresponding processing and/or API stacks used for processing of payments via billing agreements and flexible payment tokens that can be processed via the corresponding APIs of first transaction processor 140 and second transaction processor 144. In this regard, first transaction processor 140 may include a first API stack 142 and second transaction processor 144 may include a second API stack 146. In this regard, first API stack 142 may include one or more GraphQL-based APIs that may interact with one or more similar GraphQL-based APIs of service provider server 120 to exchange API calls and requests, including processing of mutations for query-based read/write operations. In contrast, second API stack 146 may correspond to a legacy API stack and/or processing system that may generate and processing billing agreements for billing agreement generation, tokenization, and payment processing. Thus, first transaction processor 140 may interact with second transaction processor 144 to generate the billing agreements and use such billing agreements on behalf of the GraphQL or other language-based APIs of service provider server 120 and first transaction processor 140. First transaction processor 140 may include one or more APIs of first API stack 142 to interface directly with service provider server 120, while second transaction processor 144 may include billing agreement generation and billing agreement identifier processing services. This enables integrations with one or more APIs and API calls between service provider server 120, first API stack 142, and/or second API stack 146. The processes to generate billing agreements and tokenize for flexible payment tokens, tokenize existing payment agreements for nonces for flexible payment tokens, and process those payment tokens are discussed in more detail with regard to FIGS. 2, 3A, 3B, and 4.

Additionally, transaction processor system 130 includes databases 134. Databases 134 may store various identifiers and/or tokens associated with computing device 110 and/or service provider server 120. Databases 134 may also store account data, including payment instruments and authentication credentials, as well as transaction processing histories and data for processed transactions. Databases 134 may store financial information and tokenized data, as well as transactions, transaction results, and other data generated and stored by transaction processing application 132 with first transaction processor 140 and/or second transaction processor 144. Further, databases 134 may store billing agreements 135 and vaulted data 136 used for payments using flexible payment tokens.

In various embodiments, transaction processor system 130 includes at least one network interface component 138 adapted to communicate with computing device 110 and/or service provider server 120 directly using a backend communication channel and/or over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
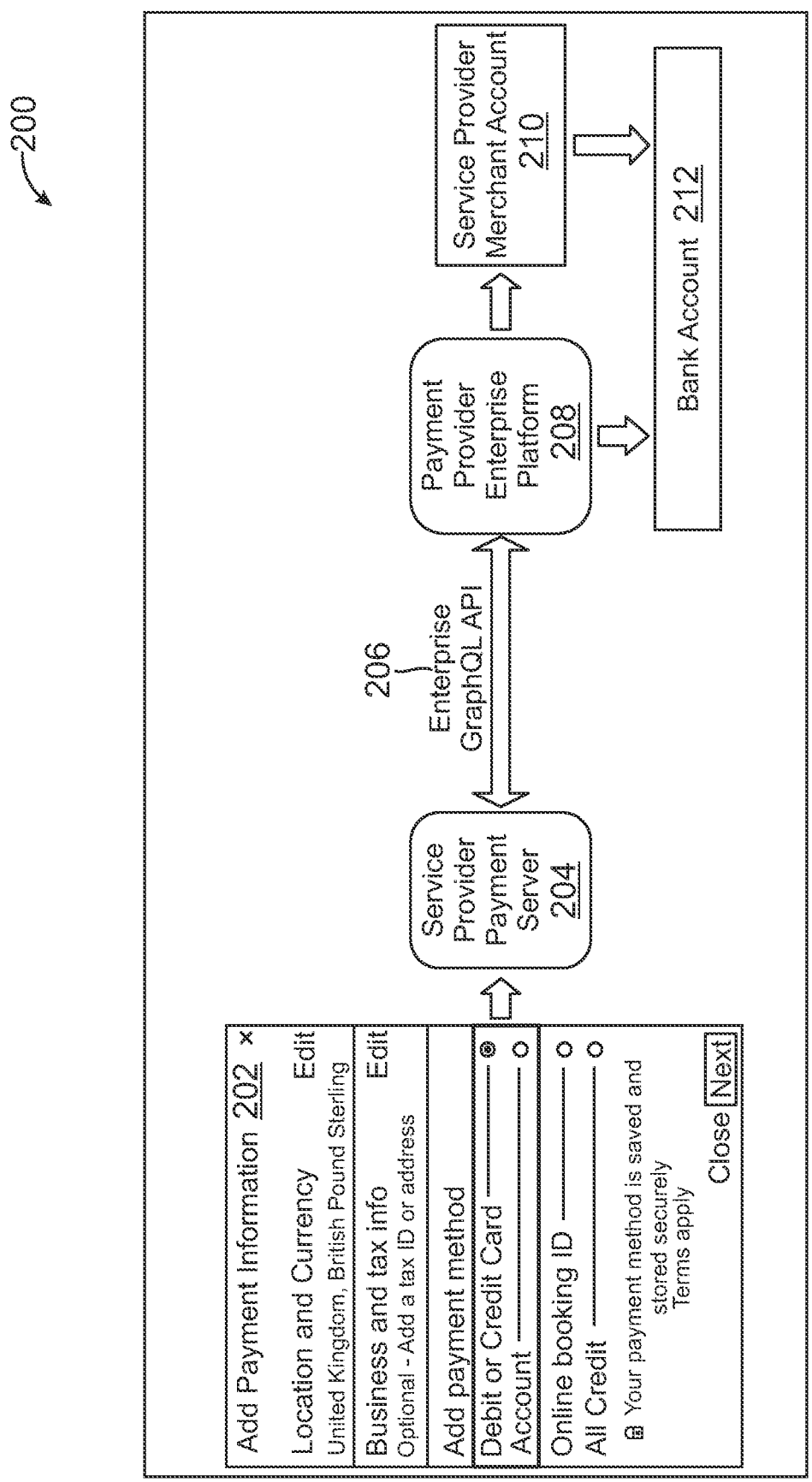
FIG. 2 is an exemplary system environment for service provider and transaction processor APIs used to generate and process flexible digital tokens, according to an embodiment.

FIG. 2 is an exemplary system environment 200 for service provider and transaction processor APIs used to generate and process flexible digital tokens, according to an embodiment. System environment 200 may include components, devices, and servers discussed in reference to system 100 of FIG. 1, such as user device 110, service provider server 120, and/or transaction processor system 130. For example, a user interface 202 may be displayed by user device 110, service provider payment server 204 may correspond to one or more servers and/or subcomponents of service provider server 120, and payment provider enterprise platform 208 may correspond to one or more servers and/or subcomponents of transaction processor system 130.

In this regard, a user may initially visit a webpage or application interface of a service provider, where the service provider provides a digital platform and computing service to the user via one or more computing device. For example, a social networking service may provide a digital platform to connect users and engage in online interactions with other users. The service provider may provide user interface 202 via the webpage or application interface, where user interface 202 allows a user to enter payment information in order to effectuate payments via the service provider's platform and services. These payments may be for future or recurring payments, and therefore a digital billing agreement may be required to be generated in order to process such payments without the user being required to repeatedly enter information and/or request processing of such payment. The billing agreement may then be tokenized as a payment token that may be used by the service provider during future payments, which requires use of an online transaction processor and the different processing system of such a transaction processor.

In order to provide a flexible payment token that is compatible with and processable by the different computing systems and processing stacks of the transaction processor, the service provider may utilize a service provider payment server 204. Service provider payment server 204 may utilize a specific type and/or language (e.g., query and manipulation language for APIs and processing systems), which requires specific integrations to be compatible with payment provider enterprise platform 208. In this regard, an enterprise GraphQL API 206 is provided as the interface between service provider payment server 204 and payment provider enterprise platform 208. Enterprise GraphQL API 206 may be provided by payment provider enterprise platform 208 to exchange API calls and requests between service provider payment server 204 and payment provider enterprise platform 208. Although GraphQL-based APIs are discussed herein, it is understood that other types of APIs using different coding, programming, and/or query languages may similarly be used and made compatible for interfacing between service provider payment server 204 and payment provider enterprise platform 208. Such interfaces may be used for generation and use of billing agreements and flexible payment tokens, as discussed herein.

In response to payment provider enterprise platform 208 receiving one or more mutations and/or other API calls or requests from service provider payment server 204 via enterprise GraphQL API 206, payment provider enterprise platform 208 may execute one or more operations to generate a digital billing agreement and tokenize the billing agreement so that a flexible payment token may be generated. The payment token may be used between the systems of the corresponding online transaction processor for processing future or recurring payments without a user or other entity being required to reenter payment information, login to a payment account, and/or approve further processing. Generation of a billing agreement and tokenization as a payment token or other payment method is described in further detail with regard to FIG. 3A below. In this regard, payment provider enterprise platform 208 may interact with a service provider merchant account 210 and/or a bank account 212 in order to process a payment based on a received flexible payment token, which may identify a billing agreement. The billing agreement is associated with a payment card, bank account, available balance in a digital account, and/or another financial instrument of the corresponding entity using the service provider and processing a payment using service provider payment server 204. A payment may be processed from the financial instrument of the entity and paid to service provider merchant account 210 and/or bank account 212. Processing of a payment using a flexible payment token for a corresponding billing agreement is described in further detail with regard to FIG. 3B below.

Figure 3A:
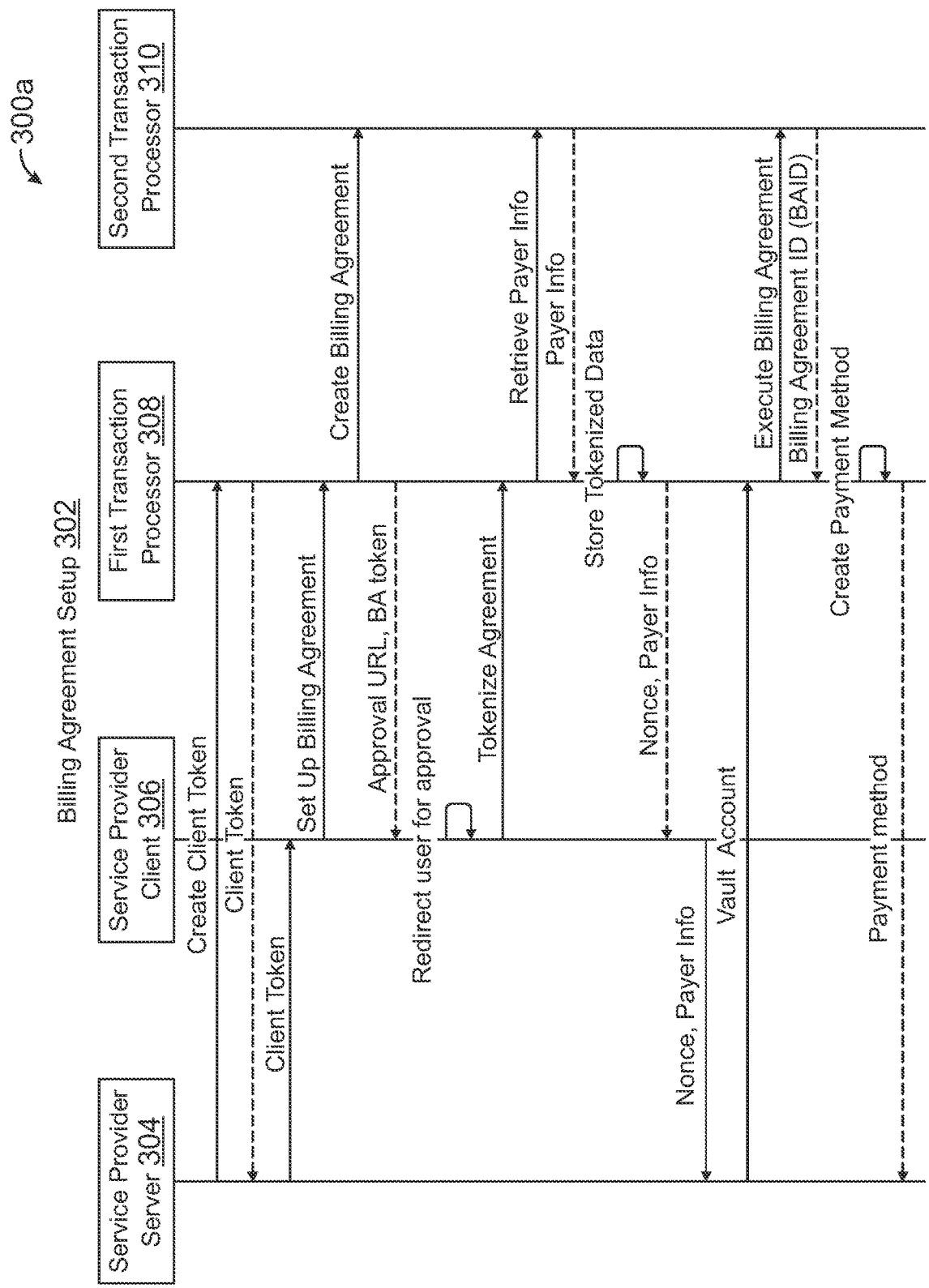
FIG. 3A is an exemplary diagram of interactions between different APIs for generating flexible digital tokens through different servers, clients, and systems, according to an embodiment.

FIG. 3A is an exemplary diagram 300a of interactions between different APIs for generating flexible digital tokens through different servers, clients, and systems, according to an embodiment. Diagram 300a includes a service provider server 304 and a service provider client 306 that may be provided by service provider server 120 discussed in reference to system 100 of FIG. 1. Further, diagram 300a includes a first transaction processor 308 and a second transaction processor 310 that may be provided by transaction processor system 130 discussed in reference to system 100.

In diagram 300a, operations and exchanged API calls, requests, and/or mutations may be exchanged for a billing agreement setup 302. In this regard, service provider server 304 may initiate billing agreement setup 302 in response to a user or entity utilizing service provider client 306 requesting one or more payments be made and/or authorized with a corresponding service provider's platform. For example, a service provider associated with service provider server 304 and/or service provider client 306 may provide a social networking platform and/or service, which may be accessible via a website and/or dedicated software applications (e.g., mobile applications for mobile smart phones). However, other digital services may also be provided by other types of online service providers that may interact with a transaction processor for electronic transaction processing and payment services in their corresponding service.

Billing agreement setup 302 may be requested when a user requests establishment of a digital billing agreement with a transaction processor so that payment may be made for future and/or recurring payments (as well as a present payment). Thus, an entity may establish the billing agreement, so that recurring or future payments do not require repeated inputs. In this regard, service provider server 304 may first create a client token with first transaction processor 308. Service provider server 304 may include an API stack that utilizes a specific language, such as GraphQL, where first transaction processor 308 is required to be compatible with such language. The GraphQL API of first transaction processor 308 allows for interfacing with GraphQL APIs of other external service providers to allow for specific queries that request and return certain data and data fields. This may alleviate bandwidth concerns with over-requesting data using HTTP requests and/or under-returning data that requires multiple HTTP requests to provide the specific data needed by clients and servers. Thus, the GraphQL API may be able to more quickly and/or efficiently serve data, as well as process mutations for data writes, deletes, insertions, and the like that may be associated with billing agreement generation and identifier tokenization for payment tokens.

However, second transaction processor 310 may correspond to another API processing system and stack, and therefore the APIs of second transaction processor 310 may not utilize the language (e.g., GraphQL-based APIs) for service provider server 304 and/or service provider client 306. In this regard, first transaction processor 308 may be integrated with the APIs of service provider server 304 and service provider client 306 so that first transaction processor 308 may exchange data for processing payment tokens and effectuating payments using the billing agreement with second transaction processor 310.

First transaction processor 308 may respond to service provider server 304 with a client token, which may be provided to service provider client 306. Service provider client 306 may utilize a setup billing agreement mutation with the GraphQL-based or other API of first transaction processor 308. The setup billing agreement mutation may correspond to a query and request that a billing agreement is established for use with future and/or recurring payments on behalf of a user using the services provided by service provider server 304 and service provider client 306. For example, a billing agreement may be used to process payments with second transaction processor 310 and an identifier for the billing agreement may be tokenized as a payment token processable and exchangeable between service provider server 304 and first transaction processor 308 using GraphQL-based APIs.

The setup billing agreement mutation may use an authorization fingerprint extracted from the client token to request creation of a billing agreement from first transaction processor 308. When received, first transaction processor 308 may request establishment of a data structure for the billing agreement from second transaction processor 310, which may return a billing agreement token or identifier. Further, second transaction processor 310 may provide first transaction processor 308 with a URL used to redirect service provider client 306 (and a corresponding entity) to a login, payment instrument entry, and/or approval interface. Once a billing agreement approval flow is completed and data is entered, the data may be provided for a tokenize account or billing agreement mutation to be requested between service provider client 306 and first transaction processor 308.

The tokenize billing agreement mutation may request billing agreement setup information be tokenized with first transaction processor 308 and second transaction processor 310. When service provider client 306 utilizes the tokenize billing agreement mutation with first transaction processor 308, the authorization fingerprint may be used by first transaction processor 308 to retrieve payer or entity information from second transaction processor 310, such as information that may be associated with a digital account for the entity that may be processed with second transaction processor 310. The payer information is provided to first transaction processor 308 where it is tokenized and stored by first transaction processor 308. Thereafter, using the authorization fingerprint and payer information, a nonce and associated payer information (which may be tokenized) are provided to service provider client 306, which in turn provides the data to service provider server 304. The nonce with the payer information may be used as a single-use payment method for the entity, which may be vaulted by service provider server 304.

Service provider server 304 may then utilize a vault account mutation with first transaction processor 308 to request vaulting of account and billing agreement information. This may return a payment token or other payment method that is usable for the future or recurring payments that are processed by second transaction processor 310 using the billing agreement. First transaction processor 308 may request that the billing agreement be executed with second transaction processor 310 based on the payer information and/or information provided via the redirection URL to the billing agreement approval flow. Once the billing agreement is executed, a billing agreement identifier (BAID) is returned to first transaction processor 308. A payment method or token is then created by first transaction processor 308 that enables future or recurring payments. First transaction processor 308 may then provide the payment method or token to service provider server 304 for use.

In some embodiments, an existing billing agreement with second transaction processor 310 may be required to be tokenized so that first transaction processor 308 may utilize a payment token for future or recurring payments with service provider server 304. In this regard, a create mutation may be used for creating and vaulting a nonce value for a customer identifier, where the nonce value may be used as the payment token and allow for reverse lookup of the billing agreement. In contrast to the create billing agreement mutation, the create mutation for an existing billing agreement may instead request that the nonce value is created for the billing agreement's identifier and vaulted so that the nonce value may be used as a payment token. Thus, the create mutation may correspond to a data processing request to create and vault a nonce value that uniquely identifies the billing agreement's identifier and may be linked to a customer's identifier so that the billing agreement may be retrieved and used during future and recurring payments. First transaction processor 308 may generate and store in a data vault the nonce value with a customer identifier. When the customer identifier is received from service provider server 304, first transaction processor 308 may determine the nonce value and use the nonce value for processing a payment using the billing agreement with second transaction processor 310.

Figure 3B:
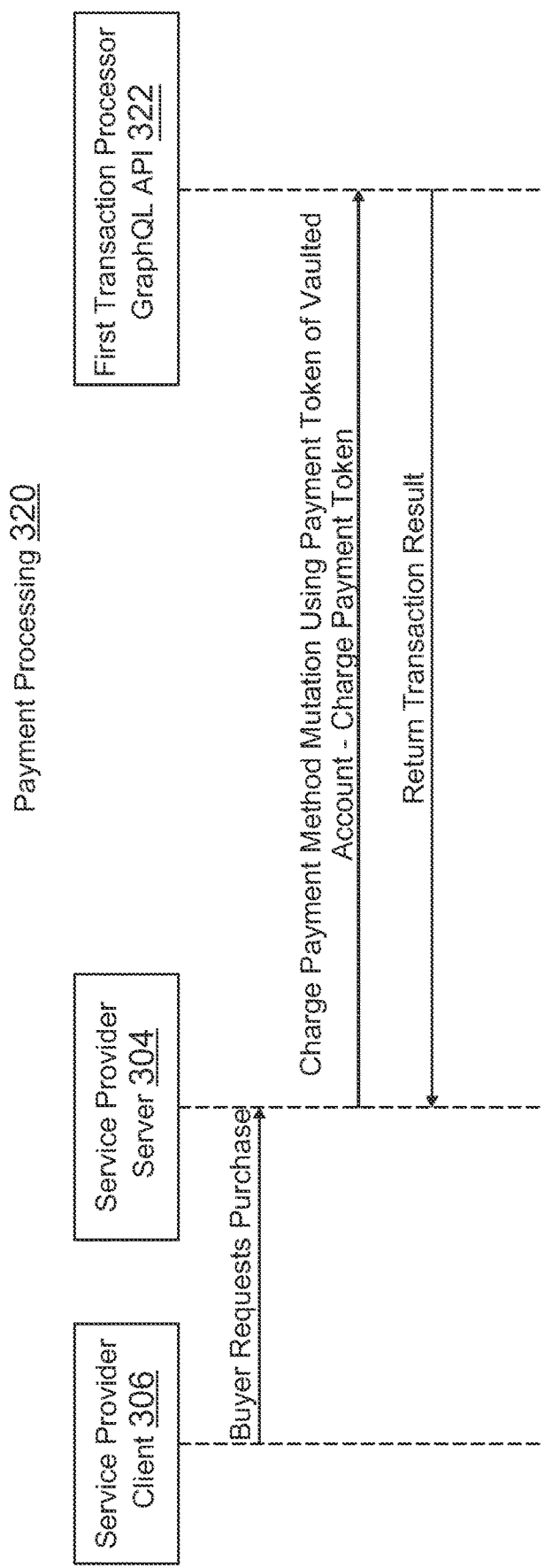
FIG. 3B is an exemplary diagram of interactions between different APIs for processing flexible digital tokens through different servers, clients, and systems, according to an embodiment.

FIG. 3B is an exemplary diagram 300*b* of interactions between different APIs for processing flexible digital tokens through different servers, clients, and systems, according to an embodiment. Diagram 300*b* includes service provider server 304 and service provider client 306 that may be provided by service provider server 120 discussed in reference to system 100 of FIG. 1. Further, diagram 300*b* includes a first transaction processor GraphQL API 322 that may be provided by transaction processor system 130 discussed in reference to system 100.

In diagram 300*b*, a flow of interactions, API calls or requests, and corresponding GraphQL mutations for a payment processing 320 is shown. In payment processing 320, a service provider client 306 may be used when a buyer or other entity requests a purchase. The purchase may correspond to a recurring purchase or a purchase that is authorized and approved for processing with a billing agreement previously established as discussed in reference to FIG. 3A. In this regard, service provider server 304 may include an API that utilizes a charge payment method mutation with first transaction processor GraphQL API 322. The mutation may utilize a payment token or other payment method for the buyer or other entity. Thereafter, first transaction processor 308 associated with first transaction processor GraphQL API 322 may utilize the payment token to process a payment with second transaction processor 310 based on a corresponding billing agreement. A transaction result is then returned by first transaction processor GraphQL API 322 to service provider server 304.

Figure 4:
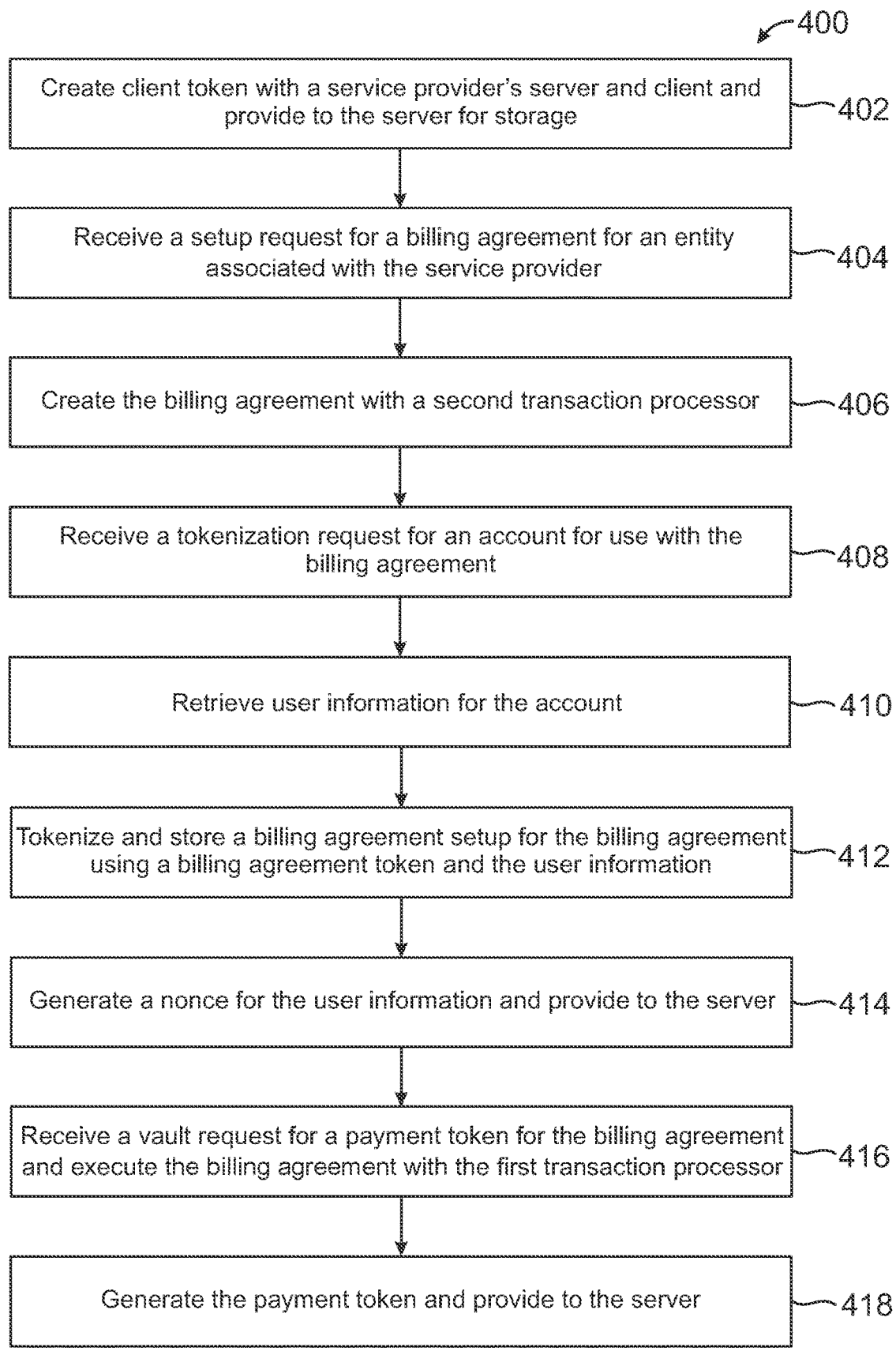
FIG. 4 is a flowchart for flexible digital tokens with application programming interfaces for reduced computing calls, according to an embodiment.

FIG. 4 is a flowchart 400 of steps for using flexible digital tokens with application programming interfaces for reduced computing calls, according to an embodiment. Note that one or more steps, processes, and methods described herein of flowchart 400 may be omitted, performed in a different sequence, or combined as desired or appropriate.

At step 402 of flowchart 400, a client token is created with a service provider's server and client, and the client token is provided to the service provider for storage. The client token may be created by a first transaction processor of an online transaction processor system that interfaces with the service provider's server and/or client via a compatible API, such as a GraphQL-based API. The client token may be used to generate an authorization fingerprint and may be generated for a particular entity based on the entity utilizing the service provider. For example, the entity may be using a social networking service provider for social networking services. At step 404, a setup request for a billing agreement for an entity with the service provider and first transaction processor is received. The setup request may correspond to a billing agreement setup mutation for a GraphQL-based API and may request that a digital billing agreement be generated for the entity that allows the service provider to process future and/or recurring payments on behalf of the entity with the first transaction processor. The first transaction processor may therefore have the compatible API with the service provider; however, a second transaction processor of the online transaction processor system may be responsible for handling and processing payments using the billing agreement. The first transaction processor and the second transaction processor may therefore each correspond to different processing systems and/or stacks, but may be incorporated within the same overall online transaction processor system and may therefore interact and process data together.

At step 406, the billing agreement is created with the second transaction processor. The first transaction processor may therefore utilize the internal systems, processing stacks, and APIs of the online transaction processor system to interface with the second transaction processor for billing agreement creation. The billing agreement may initially be created as a data structure for a payment instrument and other data necessary to process the future and/or recurring payments for the entity and may be identified using an alphanumeric identifier, such as a 17-digit identifier, that allows for transaction processing with the second transaction processor. At step 408, the tokenization request for an account for use with the billing agreement is received. The tokenization request may be received by the first transaction processor and may correspond to a tokenize account or billing agreement mutation that is used to generate a nonce and thereafter a payment method or token. The tokenization request may be provided by the service provider to the first transaction processor using the compatible API between the systems and/or processing stacks, such as the GraphQL-based API.

At step 410, user information for the account is retrieved. The user information may be retrieved by the first transaction processor from the second transaction processor based on a corresponding account, input user information, and/or financial instrument provided by the user. When providing back to the first transaction processor, the user information may be tokenized and/or stored. At step 412, a billing agreement setup for the billing agreement is tokenized and stored using a billing agreement token for the billing agreement and the user information. This may be performed by the first transaction processor. Thereafter, at step 414, a nonce for the user information is generated and provided to the server of the service provider. The nonce may correspond to a unique value that may be used as a one-time use payment method or token. The first transaction processor may generate this nonce and provide to the service provider for vaulting and/or use.

At step 416, a vault request for a payment token for the billing agreement is received and the billing agreement is executed with the first transaction processor. The vault request may correspond to a vault account mutation for the GraphQL-based API of the first transaction processor, which may request that a payment method or token is created and provided to the server of the service provider. The first transaction processor may then request that the billing agreement be executed by the second transaction processor, which returns a billing agreement identifier to the first transaction processor. At step 418, a payment token is generated using the billing agreement identifier and other data. This may be generated by the first transaction processor and may then be stored and/or used for payments. In this regard, the payment token or other payment method may be provided to the server of the service provider for payment processing using the corresponding billing agreement.

Figure 5:
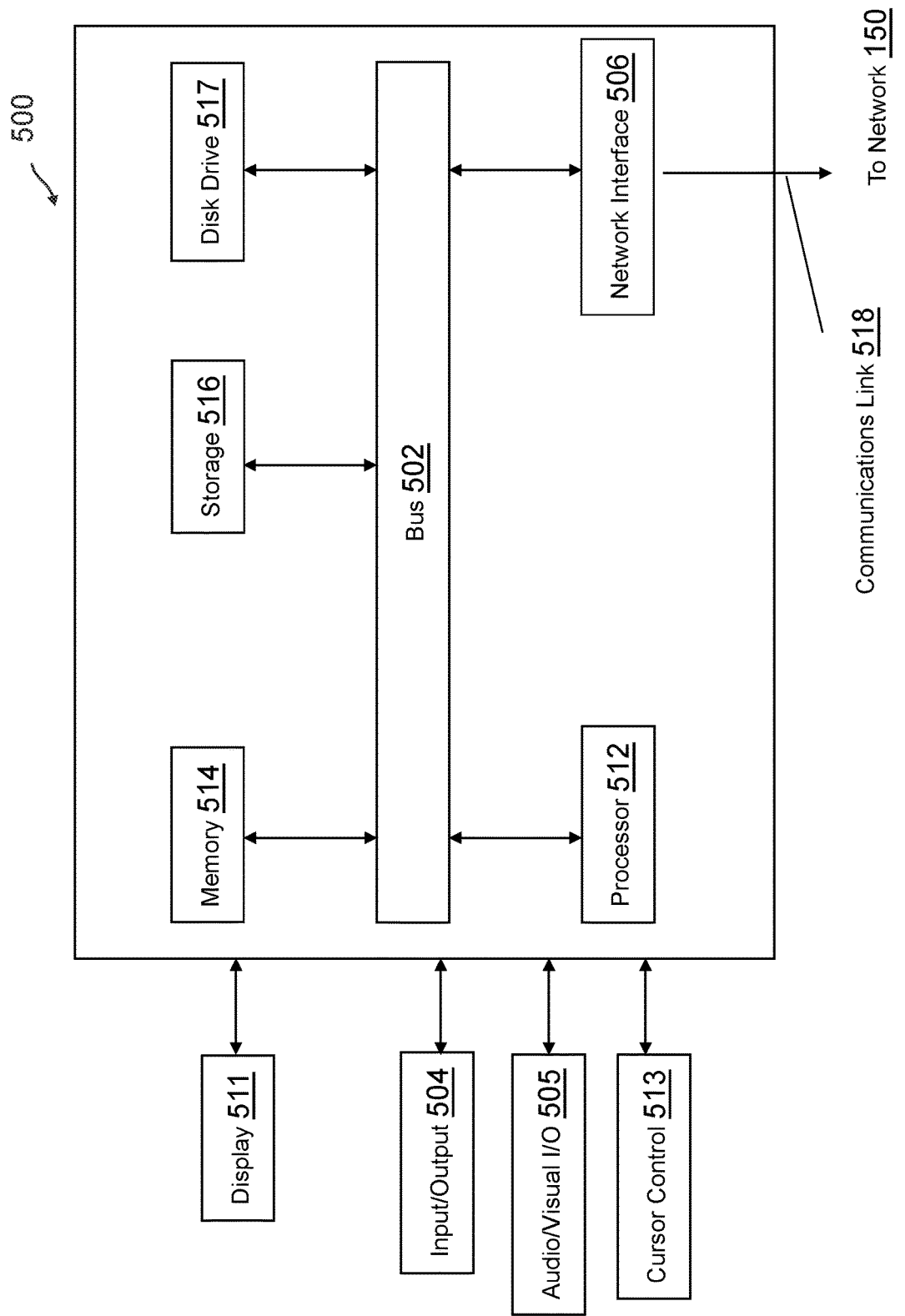
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A first transaction processor system comprising:
a non-transitory memory; and
one or more hardware processors coupled to the non-transitory memory and configured to read instructions from the non-transitory memory to cause the first transaction processor system to perform operations comprising:
receiving, by a first application programming interface (API) of the first transaction processor system from a device of a first entity, a setup query for a digital agreement between a user and the first entity with a second transaction processor system associated with the first transaction processor system, wherein the setup query is received independent of the first entity communicating with a second API of the second transaction processor system;
creating, by the first API, the digital agreement with the second transaction processor system, wherein the digital agreement comprises a data structure usable by the first entity for data processing with the first transaction processor system, and wherein the creating comprises:
generating, by the first API with the second API, the data structure for the digital agreement via a first call having a first set of data fields specified by the first API and including an authorization fingerprint extracted from a client token associated with the first entity;
receiving, for the data structure by the first API responsive to the first call, an approval uniform resource location (URL) and an agreement token for the digital agreement from the second transaction processor system based on the creating the digital agreement by the second transaction processor system, wherein the agreement token is usable with the data structure to represent an account of the user;
redirecting, using the approval URL, the device to an approval interface associated with the second transaction processor system;
receiving, by the first API, a tokenization query for a user account for a use with the digital agreement;
retrieving user information for the user account from the second transaction processor system based on the tokenization query, wherein the user information comprises at least the account identifier; and
tokenizing agreement setup information for the data structure for the digital agreement based on an agreement token for the digital agreement and the account identifier.

2. The first transaction processor system of claim 1, wherein the first API comprises at least one GraphQL API processing stack that receives and processes API calls and API queries in a GraphQL query language.

3. The first transaction processor system of claim 2, wherein each of the setup query and the tokenization query comprise a GraphQL mutation query associated with API queries to the at least one GraphQL API processing stack.

4. The first transaction processor system of claim 1, wherein the operations further comprise:
generating, based on the tokenizing, a nonce for the user information; and
transmitting the nonce to a server of the first entity.

5. The first transaction processor system of claim 4, wherein the operations further comprise:
receiving, by the first API responsive to transmitting the nonce, a vault query for a payment token associated with the digital agreement by the first transaction processor system;
requesting that the digital agreement is executed with the second transaction processor system based on data received from the approval interface and the user information;
generating the payment token based on the digital agreement; and
transmitting the payment token to the server of the first entity.

6. The first transaction processor system of claim 5, wherein the payment token is usable with the first API for at least one of a recurring payment or a future payment processed by the first transaction processor system with the second transaction processor system using the digital agreement.

7. The first transaction processor system of claim 1, wherein prior to receiving the setup query, the operations further comprise:
receiving, by the first API, a create client token query for a user associated with the user account from a server of the first entity;
generating a client token for the user;
transmitting the client token to the server; and
extracting an authorization fingerprint for the user,
wherein the client token is received from the device with the setup query, and wherein the creating and the tokenizing utilize the authorization fingerprint.

8. The first transaction processor system of claim 1, wherein the digital agreement comprises a billing agreement that includes at least one selected payment instrument for use with payments by the user with the first entity via the billing agreement.

9. The first transaction processor system of claim 1, wherein, prior to the generating the data structure, the creating the digital agreement further comprises:

transmitting, by the first API to the second API, a second call having a second set of data fields specified by the first API, wherein the second call requests that the client token is created;

receiving, by the first API, the client token from the second API; and extracting, by the first API, the authorization fingerprint from the client token.

10. A method comprising:

identifying, by a first transaction processor, a billing agreement token associated with an account of a user with a second transaction processor, wherein the user is associated with a user identifier for the account and the user, and wherein the billing agreement token is associated with a billing agreement for generation by the second transaction processor;

generating, using an application programming interface (API) of the first transaction processor, a nonce value associated with the billing agreement token;

mapping, by the first transaction processor, the nonce value to the billing agreement token and the user identifier;

transmitting, using the API of the first transaction processor to a service provider server, the nonce value;

executing, using the API of the first transaction processor, a vaulting query for the nonce value;

storing, by the first transaction processor based on the vaulting query, the nonce value for the account and the billing agreement token;

generating, using the API with the second transaction processor, a data structure for the billing agreement based on a set of data fields specified by the API and including an authorization fingerprint extracted from a client token associated with at least the user, wherein the API calls the second transaction processor and creates the billing agreement with the second transaction processor system; and receiving, by the API for the data structure, an approval uniform resource location (URL) and an agreement token for the billing agreement from the second transaction processor, wherein the agreement token is usable with the data structure to represent the account of the user.

11. The method of claim 10, wherein the API of the first transaction processor utilizes one or more GraphQL queries for the generating, the transmitting, and the executing, and wherein the one or more GraphQL queries comprise GraphQL mutations.

12. The method of claim 10, further comprising:

receiving, by the API from the second transaction processor, a billing agreement identifier indicating that the billing agreement was generated by the second transaction processor; and vaulting the billing agreement identifier for the user.

13. The method of claim 12, further comprising:

creating a payment token for the billing agreement identifier, wherein the payment token enables recurring payments to be authorized for the user with the service provider server.

14. The method of claim 13, further comprising:

transmitting the payment token to the service provider server.

15. The method of claim 10, wherein the billing agreement is associated with a billing agreement identifier comprising a number of alphanumeric character for processing with the second transaction processor, and wherein the nonce value is generated using the billing agreement identifier.

16. A non-transitory machine-readable medium having stored thereon machine-readable instructions executable to cause a machine to perform operations comprising:

generating, using an application programming interface (API) of a first transaction processor with a second transaction processor, a data structure for a billing agreement for an account of a user using an API call having a set of data fields specified by the API and including an authorization fingerprint extracted from a client token associated with at least the user, wherein the API call causes the second transaction processor to create the billing agreement with the second transaction processor system;

receiving, for the data structure by the API responsive to the API call, an approval uniform resource location (URL) and an agreement token for the billing agreement from the second transaction processor, wherein the agreement token is usable with the data structure to represent the account of the user;

generating a payment token by the first transaction processor using a nonce value created from a billing agreement identifier for the billing agreement previously generated by the second transaction processor;

providing the payment token to a service provider server;

receiving, by the API of the first transaction processor, the payment token from the service provider server with a transaction processing query for a transaction, wherein the payment token is stored by the first transaction processor and associated with the billing agreement for the user with the second transaction processor;

accessing, by the first transaction processor, the billing agreement stored by the first transaction processor; and processing, using the API of the first transaction processor, the transaction with the second transaction processor using the billing agreement.

17. The non-transitory machine-readable medium of claim 16, wherein the billing agreement is previously generated by the second transaction processor based on a GraphQL mutation query from the API of the first transaction processor.

18. The non-transitory machine-readable medium of claim 17, wherein the billing agreement comprises a payment instrument provided by the user for one or more recurring payments by the service provider server with the first transaction processor.

19. The non-transitory machine-readable medium of claim 16, wherein the nonce value is further created using user information for an account associated with the billing agreement.

20. The non-transitory machine-readable medium of claim 16, wherein the billing agreement identifier is incompatible with the API of the first transaction processor, and wherein the nonce value is stored by the second transaction processor with a customer identifier for the user.

* * * * *